Aug. 1, 1961  M. POLLMANN  2,994,251
METHOD FOR PRODUCING FILTER RODS
Filed July 24, 1958
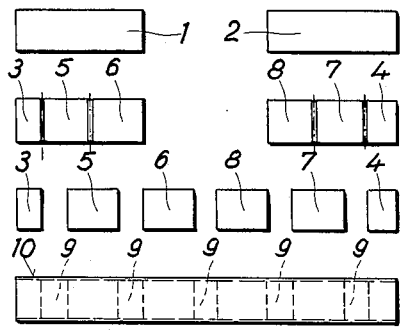
Fig. 1
Fig. 2
Fig. 3
Fig. 4
Fig. 5
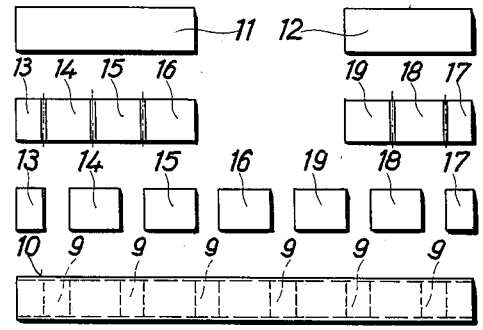
Fig. 6
Fig. 7
Fig. 8
Fig. 9
Fig. 10
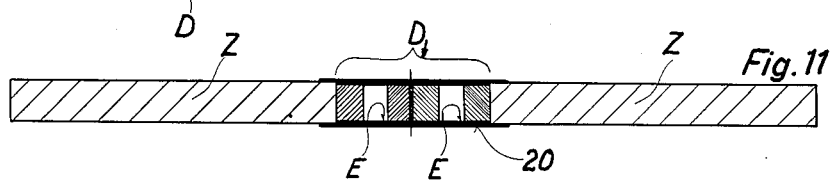
Fig. 11
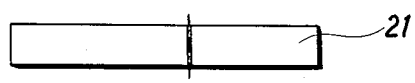
Fig. 12
Fig. 13
INVENTOR:
Max Pollmann,
BY Singer, Stern & Carlberg
Attorneys.

United States Patent Office 2,994,251
Patented Aug. 1, 1961

2,994,251
METHOD FOR PRODUCING FILTER RODS
Max Pollmann, Hamburg-Bergedorf, Germany, assignor to Hauni-Werke Korber & Co., K.G., Hamburg-Bergedorf, Germany
Filed July 24, 1958, Ser. No. 750,736
Claims priority, application Germany Aug. 31, 1957
8 Claims. (Cl. 93—1)

The present invention relates to the production of filter rods of the character used for the production of filter mouthpieces for cigarettes, cigarillos and the like.

In order to reduce the length of filter mouthpieces, especially in the case of filter mouthpieces with several filters in which a hollow space is provided between each pair of filters, it becomes necessary to utilize the shortest possible filter plugs, the length of which is often smaller than the diameter of the plug. Such filter plugs tend to tilt when they are subjected to the axial displacement necessary for forming the hollow space.

For these reasons the invention provides a method for producing hollow-space filter rods consisting alternately of filter plugs and hollow spaces, wherein two filter rods are axially aligned at a spacing equal to the sum of the desired hollow spaces and are severed into plugs comprising those of the final length and those of twice the final length, in such manner that the former are disposed at the opposed ends of the two filter rods, whereupon the plugs lying between the two aforesaid plugs and of twice the final length are moved towards the center and along the said spacing forming the hollow spaces and are then wrapped together with the end plugs by means of a common connector sheet.

If filter plugs are required in which the sum of the plug lengths represents an uneven multiple, for example five times the double plug length, these filter plugs can be produced from two filter rods of the same length.

According to a further feature of the invention in order to be able to avoid the feeding and axial alignment of two filter rods, provision is made that, starting from one filter rod corresponding to the length of the two rods, the said rod is cut into lengths whereupon the two filter rod sections are moved apart by the amount of the sum of the desired hollow spaces.

If however filter rods are to be produced of which the sum of the plug lengths is derived from an even multiple of the plug lengths, for example six times the double plug length, the two filter rods must differ in length by the amount of one double plug length or an uneven multiple thereof.

One constructional example of the invention is shown diagrammatically in the accompanying drawings wherein:

FIG. 1 shows two filter rods of the same length which together are equal to five times the double plug length, FIG. 2 shows the rods according to FIG. 1 after severing, FIG. 3 shows the double plugs according to FIG. 2 displaced towards the centre, FIG. 4 shows the plug group according to FIG. 3 after wrapping, FIG. 5 shows the wrapped plug groups according to FIG. 4 divided into double plug filter mouthpieces or mouthpiece units having two filter plugs in spaced apart relation, FIG. 6 shows two filter rods of unequal length which together have six times the double plug length, FIG. 7 shows the rods according to FIG. 6 after cutting, FIG. 8 shows the double plugs according to FIG. 7 displaced towards the centre, FIG. 9 shows the plug group according to FIG. 8 after wrapping, FIG. 10 shows the double filter mouthpieces or mouthpiece units according to FIG. 9 after severance to form double filter mouthpieces, FIG. 11 shows in section a cigarette mouthpiece assembly with a double filter mouthpiece in section produced according to the invention, FIG. 12 shows a filter rod of six times the double plug length with the cutting point, and FIG. 13 shows the two rod sections as shown in FIG. 6 after they have been moved apart.

Two filter rod elements 1 and 2 produced in any convenient manner known in the art, and of the same length are deposited in the grooves of a feeder means, not shown, but which may be a chain or a fluted drum. Each rod is of 2½ times the double plug length and they are spaced apart by an amount corresponding to five times the length of the hollow spaces. The conveyor means referred to are not shown on the accompanying drawings as they do not form any part of the invention and will be readily understood by those skilled in the art. Each of these filter rod elements 1 and 2 is severed by known means, for example by two adjacently arranged circular cutter blades, into single plugs 3 and 4 respectively and a series of other plugs of double plug lengths 5 and 6 on the one hand and 7 and 8 on the other hand, as shown in FIG. 2. Such cutting means also are conventional in the art and it has not therefore been deemed necessary to show them in detail.

British Patent 750,288 illustrates the manner in which filter rods can be deposited in the grooves of a drum 5 therein, and U.S. Patent 2,882,970 illustrates how a filter rod can be cut into suitable lengths by a plurality of cutters 19, 20, 21 and 22 (FIG. 2).

The two plugs 3 and 4 lie at the mutually opposed ends of the two assemblies formed from the rods 1 and 2. By suitable means well-known in the art, for example wedge-shaped guide blades, the double plugs 5, 6, 7 and 8 are displaced towards the center in such a manner that between the plugs 3 and 5, 5 and 6, 6 and 8, 8 and 7 and 7 and 4 a space is formed in each case which corresponds to the desired length of the hollow space 9 as shown in FIG. 4. Again the means for doing so are well-known in the art and not therefore shown in detail.

In this way the single length plugs and double length plugs forming a pre-positioned group are wrapped by means of a connector sheet 10 as shown in FIG. 4; the means for applying and wrapping such sheet being well-known in the art and not therefore shown in detail. In this way the production of hollow space filter rods having spaced apart plugs is completed; these hollow space filter rods are then severed to form individual filter mouthpiece units E of the final length or of twice the final length in a separate machine which may be a machine for producing filter cigarettes and in which the mouthpieces or mouthpiece units are joined to cigarettes.

For producing hollow space filter rods of for example six times the final length, the arrangement shown in FIGS. 6 to 10 is adopted wherein a filter rod 11 of 3½ times the double plug length and a filter rod 12 of 2½ times the double plug length are deposited in the grooves of a conveyor means at spacings equivalent to six times the length of the hollow spaces. The rod 11 is then cut, as shown in FIG. 7, by three circular cutters into a plug 13 of the final length and three plugs 14, 15, 16 of twice the final length, while the rod 12 is cut by two circular cutters into one plug 17 of the final length and two plugs 18 and 19 of twice the final length. The further method steps according to FIGS. 8 to 10 then follow as will obviously be seen by comparison with FIGS. 3 to 5. Thus, filter mouthpiece units of double length are formed.

Such hollow filter rods of sixfold final length are generally severed to form double length mouthpiece units and are handled in machines in which two cigarettes Z are axially aligned with the two ends of a hollow filter mouthpiece unit D of twice the final length and are joined thereto by means of a connector sheet 20. This group or assembly consisting of two cigarettes Z and a double filter mouthpiece unit D is thereafter severed in the centre so that two filter cigarettes are produced each with a hollow filter mouthpiece E as shown in FIG. 11.

Starting from a filter rod 21 of for example sixfold the double final length, this is severed as shown in FIG. 12 into two rod elements and the said elements 11 and 12 (FIG. 13) are moved apart to the position shown in FIG. 6. The further treatment is then effected as shown in FIGS. 7 to 10.

What I claim is:

1. A method for producing composite hollow space filter rods having spaced apart filter plugs from which may be cut double length filter mouthpiece units with a space between the plugs of each filter unit, comprising the steps of arranging a pair of filter elements of a length equal to a plurality of filter plugs in spaced apart relation and axially aligned, cutting said filter rod elements at a plurality of points so that the end portions will be of a length equal to one of the filter plugs of the filter mouthpiece unit and the intermediate cut portions will be of a length equal to two filter plugs of said filter mouthpiece units, spacing said filter plugs after they have been cut by moving the same inwardly to fill the original spacing so that said plugs will be equally spaced one from the other to form air gaps therebetween, and finally wrapping said filter plugs by a common connector and wrapper sheet.

2. A method for producing composite hollow space filter rods having spaced apart filter plugs from which may be cut filter units with spaces between the plugs, comprising the steps of arranging a pair of filter rod elements in spaced apart relation each of which is of a length equal to a plurality of filter plugs, arranging said filter elements in axially aligned positions, cutting said filter rods at a plurality of spaced apart points such that the end portions will be of a length equal to one of the filter plugs of the filter mouthpiece unit while the intermediate portions will be cut and will be of a length equal to two filter plugs of said filter mouthpiece units, displacing said cut filter plugs axially after they have been cut by moving the intermediate plugs apart in a direction toward the original spacing so that said filter plugs will be equally spaced one from the other to form air gaps therebetween of uniform mutual spacing, and finally wrapping said filter plugs in their spaced apart relation.

3. A method for producing composite hollow space filter rods having spaced filter plugs from which may be cut double length filter mouthpiece units each having a pair of filter rod plugs separated by an air space, the steps of arranging and spacing lengths of filter material of rod-like shape a distance apart equal to the total spacing of the filter plugs in the finished product, cutting said lengths of filter rod material at a plurality of points in spaced apart relation so that the end portions of the assembly will be of a length equal to one of the filter plugs of the filter mouthpiece units and the intermediate cut portions will be of a length equal to two filter plugs of said filter mouthpiece units, spacing said filter plugs after they have been cut to obtain uniform spacing of all of the plugs, and wrapping said spaced plugs with a wrapper sheet, the completed composite filter rod being of a length equal to the length of the outermost cut plugs and the double length of the intermediate sections plus the distance said plugs are spaced one from the other.

4. A method for producing composite hollow space filter rods having spaced filter plugs from which may be cut filter mouthpiece units of double length with each filter unit including a pair of spaced apart filter plugs having an air space therebetween, the steps of arranging a pair of filter rod elements of rod-like form in spaced apart and axially aligned relation, at least one of said filter rod elements being of a length equal to an uneven number of said filter plugs, cutting said filter rod elements at a plurality of points such that the end portions will be of a length equal to one of the filter plugs of the double length filter mouthpiece units while the intermediate cut portions will be of a length equal to two filter plugs of said double mouthpiece filter units, displacing said intermediate cut portions axially in a direction toward the original spacing of rod-like filter elements while maintaining the outer endmost cut portions in a fixed position to space all of said cut portions equal and uniform distances apart the total length of said spacing being equal to the original spacing of said rod-like pieces of filter rod elements, and finally enclosing all of said filter plugs in a common longitudinal wrapper.

5. A method according to claim 4 wherein the two lengths of rod-like filter material are of equal length.

6. A method according to claim 4 wherein the rod-like sections of filter material differ from one another in length by an amount equal to $(2x-1)$ times the length of one double length filter plug where $x$ equals a whole number.

7. A method according to claim 4 wherein, starting from filter rod-like material corresponding to the length of the two filter plugs, pieces of such length are cut whereupon the two pieces are moved apart by an amount equal to the sum of the hollow spaces between said plugs.

8. A method of producing filter elements attached to pairs of cigarettes in the form of a double mouthpiece filter unit each having a pair of filter plugs separated by an air space, the steps comprising positioning a pair of rod-like sections of filter material in axial alignment and in spaced apart relation a distance equal to the spacing of said filter plugs in the filter mouthpiece units times the number of spaces to be formed, cutting said sections of filter material at a plurality of points so that the outer end sections when cut form a single filter plug while the intermediate cut sections form filter plugs or double length, displacing said intermediate plugs in a direction inwardly from said outermost plugs to obtain uniform spacing of the plugs and the formation of air gaps therebetween, the total distance of said spacing being equal to the space between the pair of filter material sections of rod-like form, and finally wrapping said spaced apart plugs in a common connector and wrapper sheet to form said double mouthpiece filter units, said filter units being cut so that in final form they comprise end plugs of a length equal to the length of a single filter plug set in said filter mouthpiece unit and the intermediate plugs being of a length equal to a pair of said filter plugs in said filter mouthpiece unit, the cut sections of said rod like sections of filter material being adapted to be positioned between pairs of cigarettes and united therewith for cutting at a central point to form filter mouthpiece units on one end of each cigarette with each unit including a pair of spaced apart filter plugs providing an air gap therebetween.

References Cited in the file of this patent

UNITED STATES PATENTS

| | | |
|---|---|---|
| 2,707,960 | Janecke | May 10, 1955 |
| 2,882,970 | Schur | Apr. 21, 1959 |

FOREIGN PATENTS

| | | |
|---|---|---|
| 557,280 | Italy | Feb. 13, 1957 |
| 737,329 | Great Britain | Sept. 21, 1955 |
| 740,329 | Great Britain | Nov. 9, 1955 |
| 750,288 | Great Britain | June 13, 1956 |